United States Patent
Troy et al.

(10) Patent No.: US 9,355,498 B2
(45) Date of Patent: May 31, 2016

(54) VIEWPOINT CONTROL OF A DISPLAY OF A VIRTUAL PRODUCT IN A VIRTUAL ENVIRONMENT

(71) Applicant: The Boeing Company, Chicago, IL (US)

(72) Inventors: James J. Troy, Issaquah, WA (US); Scott W. Lea, Renton, WA (US); Daniel J. Wright, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 166 days.

(21) Appl. No.: 14/308,840

(22) Filed: Jun. 19, 2014

(65) Prior Publication Data

US 2015/0371443 A1    Dec. 24, 2015

(51) Int. Cl.
*G09G 5/00* (2006.01)
*G06T 19/00* (2011.01)
*G06T 15/20* (2011.01)
*G06T 15/50* (2011.01)

(52) U.S. Cl.
CPC ............... *G06T 19/006* (2013.01); *G06T 15/20* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 6,919,867 B2 * | 7/2005 | Sauer | A61B 19/5244 345/7 |
| 7,859,655 B2 | 12/2010 | Troy et al. | |
| 8,138,938 B2 | 3/2012 | Troy et al. | |
| 8,510,039 B1 | 8/2013 | Troy et al. | |
| 2010/0208033 A1 * | 8/2010 | Edge | G06F 3/012 348/46 |
| 2013/0092805 A1 * | 4/2013 | Funk | F16M 13/02 248/121 |
| 2013/0321391 A1 | 12/2013 | Troy et al. | |
| 2014/0139717 A1 * | 5/2014 | Short | H04N 7/142 348/333.1 |

OTHER PUBLICATIONS

Smith et al., "Tracking-Enabled Multi-Axis Tool for Limited Access Inspection," U.S. Appl. No. 13/750,565, filed Jan. 25, 2013, 23 pages.
Gass et al., "Locator System for Three-Dimensional Visualization," U.S. Appl. No. 13/855,102, filed Apr. 2, 2013, 87 pages.

* cited by examiner

*Primary Examiner* — Edward Martello
(74) *Attorney, Agent, or Firm* — Yee & Associates, P.C.

(57) ABSTRACT

A method, system, and apparatus for visually presenting a virtual environment relative to a physical workspace. An output device visually presents a view of the virtual environment to guide a human operator in performing a number of operations within the physical workspace. A mounting structure holds the output device and is movable with at least one degree of freedom relative to the physical workspace. A sensor system measures movement of the output device relative to the physical workspace to generate sensor data. A controller computes a transformation matrix and the set of scale factors to align the virtual environment and the physical workspace. The controller changes the view of virtual environment based on the sensor data to thereby change the view of the virtual environment in correspondence with the movement of the output device relative to the physical workspace.

20 Claims, 13 Drawing Sheets

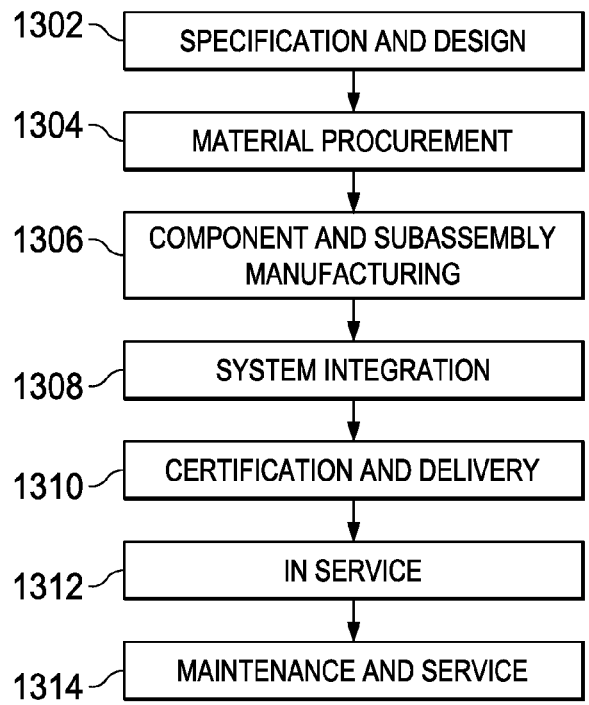
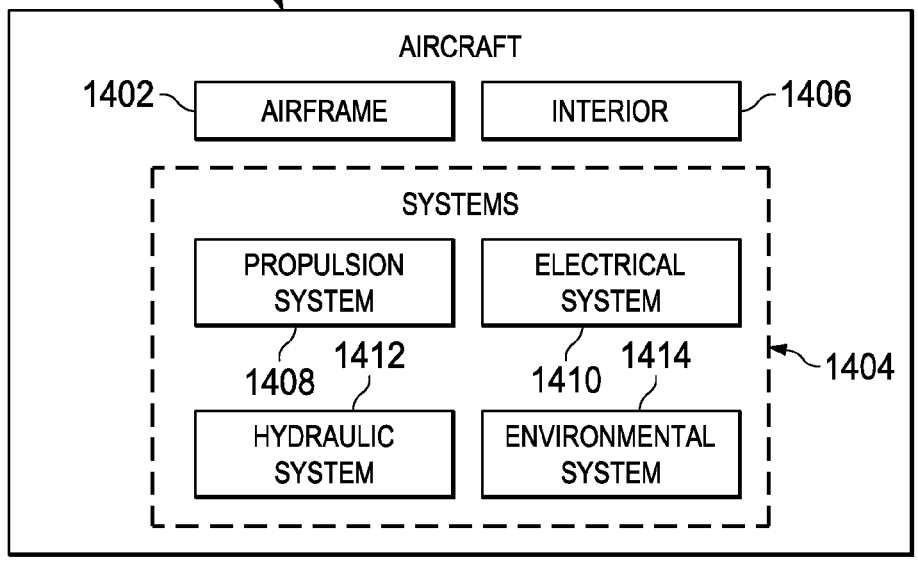

VIEWPOINT CONTROL OF A DISPLAY OF A VIRTUAL PRODUCT IN A VIRTUAL ENVIRONMENT

BACKGROUND INFORMATION

1. Field

The present disclosure relates generally to virtual environments and, in particular, to virtual environments that include virtual objects representing physical objects. Still more particularly, the present disclosure relates to an apparatus, system, and method for displaying a virtual representation of an object relative to the physical form of the object in a workspace.

2. Background

During the assembly of complex devices, various parts may need to be installed in specific locations. An operator performing an assembly task may use paper manuals, electronic manuals, or both for basic guidance to perform the task. However, in some cases, the different parts being installed and the locations for installation may look so similar to each other that looking at paper manuals and electronic manuals may provide insufficient guidance. For example, without added context for the exact locations at which parts are to be installed, the static pictures of the parts presented in these types of manuals may not provide enough detail to clearly describe where to install the part.

Having access to an interactive three-dimensional (3D) model of the assembly can provide additional information by allowing inspection of different views of the part and the physical location in the assembly where the part is to be installed. Without an accurate reference to the physical location in the assembly, errors may still occur during part installation.

Further, some currently available techniques for installing parts may be more time-consuming and require more effort than desired. For example, the $17^{th}$, $18^{th}$, and $19^{th}$ ribs of an aircraft wing may look similar. To install a specific bracket on the $17^{th}$ rib, an operator may need to manually count the ribs, use a tape measure, or perform some other localization or measurement technique to identify the $17^{th}$ rib. Therefore, it would be desirable to have a method and apparatus that take into account at least some of the issues discussed above, as well as manufacturing, maintenance, inspection, or other possible issues.

SUMMARY

In one illustrative embodiment, an apparatus for visually presenting a virtual environment relative to a physical workspace comprises an output device, a mounting structure, a sensor system associated with at least one of the mounting structure or the output device, and a controller. The output device visually presents a view of the virtual environment to guide a human operator in performing a number of operations within the physical workspace. The mounting structure holds the output device and is movable with at least one degree of freedom relative to the physical workspace. The sensor system measures movement of the output device relative to the physical workspace to generate sensor data. The controller computes a transformation matrix and a set of scale factors to align the virtual environment and the physical workspace. The controller changes the view of the virtual environment based on the sensor data, the transformation matrix, and the set of the scale factors to thereby change the view of the virtual environment in correspondence with the movement of the output device relative to the physical workspace.

In another illustrative embodiment, a system for visually presenting a virtual environment relative to a physical workspace comprises an output device, a support structure, a mounting structure, an alignment system, a sensor system, and a controller. The output device visually presents a view of the virtual environment to guide a human operator in performing a number of operations within the physical workspace. The support structure is positioned relative to the physical workspace. The mounting structure holds the output device and is movable with at least one degree of freedom relative to the physical workspace. The mounting structure is moveable relative to the support structure. The alignment system enables an alignment of the physical workspace and the virtual environment by allowing a set of physical features in the physical workspace that correspond to a set of virtual features in the virtual environment to be located. The set of physical features and the set of virtual features have been preselected for the physical workspace and the virtual environment, respectively. The sensor system measures movement of the output device relative to the physical workspace to generate sensor data. The controller computes a set of positions for the set of physical features based on the sensor data. The controller computes a transformation matrix and a set of scale factors to align the virtual environment and the physical workspace using the set of positions. The controller changes the view of virtual environment based on the sensor data, the transformation matrix, and the set of scale factors to thereby change the view of the virtual environment in correspondence with the movement of the output device relative to the physical workspace.

In yet another illustrative embodiment, a method for visually presenting a virtual environment relative to a physical workspace is provided. A view of the virtual environment is visually presented on an output device while the output device is positioned relative to the physical workspace. A transformation matrix is computed to perform an alignment between the virtual environment and the physical workspace. A set of scale factors is computed to improve an accuracy of the alignment. The output device is moved relative to the physical workspace with respect to at least one degree of freedom using a mounting structure that holds the output device. Movement of the output device relative to the physical workspace is measured using a sensor system to generate sensor data. The view of the virtual environment is changed based on the sensor data, the transformation matrix, and the set of scale factors. The view of the virtual environment is changed in correspondence with the movement of the output device relative to the physical workspace.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of an aircraft manufacturing and service method in the form of a block diagram in accordance with an illustrative embodiment; and FIG. 14 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a system capable of visually presenting a virtual environment on a display device positioned relative to a physical workspace. The virtual environment may include a virtual product that is a digital representation of a physical product for which operations are to be performed within the physical workspace. For example, manufacturing operations may be performed within the physical workspace to assemble the product. In other illustrative examples, inspection operations, painting operations, maintenance operations, repair operations, other types of operations, or some combination thereof may be performed for the product within the physical workspace.

Further, the illustrative embodiments also recognize and take into account that it may be desirable to position the display device relative to the physical workspace in a manner such that the display device does not interfere with the operations to be performed within the physical workspace. The illustrative embodiments also recognize and take into account that it may be desirable to change a viewpoint from which the virtual environment is visually presented on the display device. In particular, the illustrative embodiments recognize and take into account that it may be desirable to change the viewpoint for the virtual environment in correspondence with movement of the display device relative to the physical workspace.

Thus, the illustrative embodiments provide an apparatus, system, and method for visually presenting a virtual environment relative to a physical workspace. In one illustrative embodiment, an apparatus for visually presenting a virtual environment relative to a physical workspace comprises an output device, a mounting structure, a sensor system associated with at least one of the mounting structure or the output device, and a controller. The output device visually presents a view of the virtual environment to guide a human operator in performing a number of operations within the physical workspace. The mounting structure holds the output device and is movable with at least one degree of freedom relative to the physical workspace. The sensor system measures movement of the output device relative to the physical workspace to generate sensor data. The controller computes a transformation matrix and a set of scale factors used to align the virtual environment and the physical workspace. The controller changes the view of the virtual environment based on the sensor data, the transformation matrix, and the set of the scale factors thereby change the view of the virtual environment in correspondence with the movement of the output device relative to the physical workspace.

Figure 1:
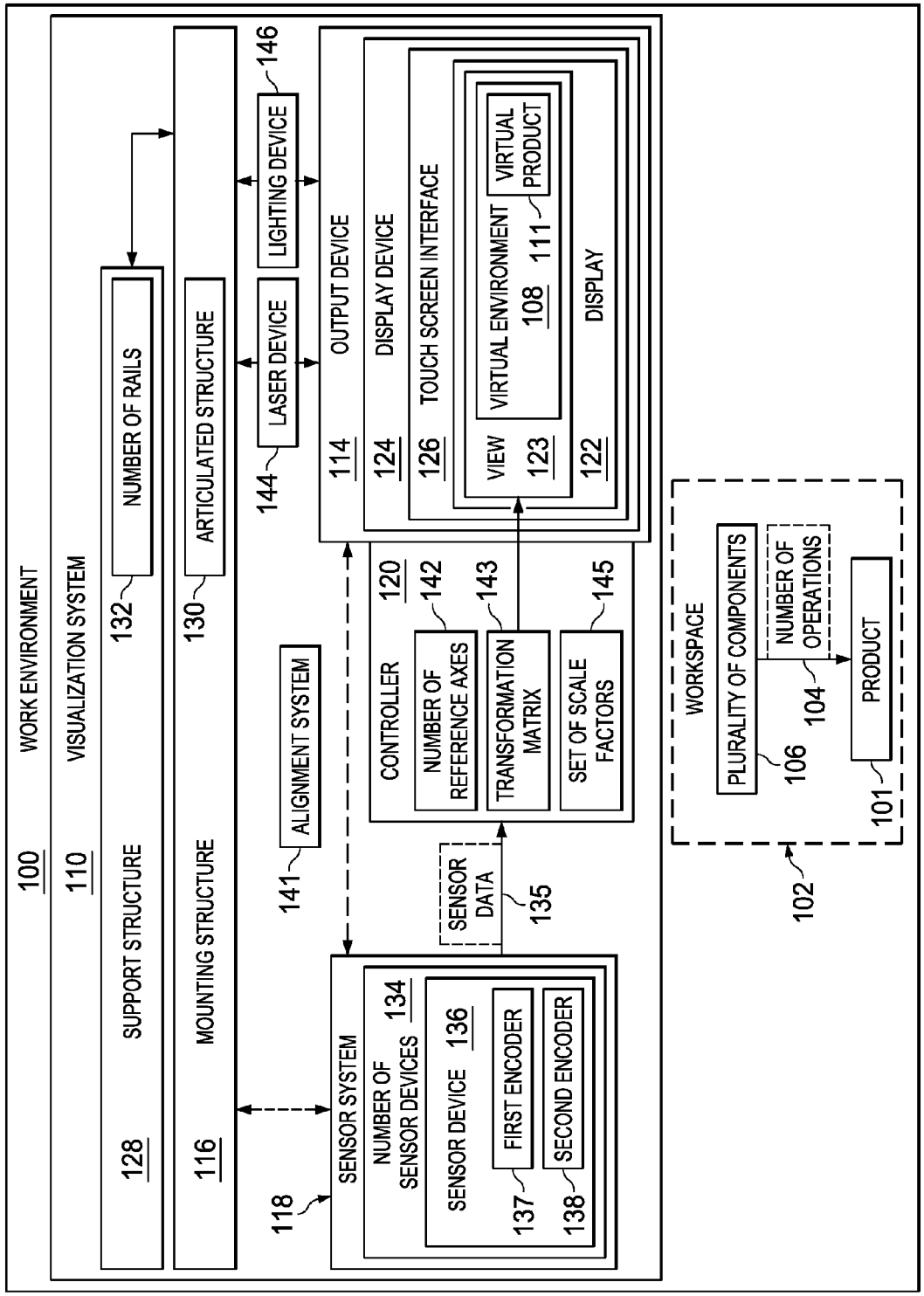
FIG. 1 is an illustration of a work environment in the form of a block diagram in accordance with an illustrative embodiment.

Referring now to the figures and, in particular, with reference to FIG. 1, an illustration of a work environment is depicted in the form of a block diagram in accordance with an illustrative embodiment. In FIG. 1, work environment 100 is an example of an environment in which work related to product 101 may be performed.

Product 101 is a physical product. Product 101 may take a number of different forms, depending on the implementation. For example, without limitation, product 101 may be a wing for an aircraft, an engine system, a computer, an electronic circuit, a spar assembly, a rib assembly, or some other type of physical product.

In this illustrative example, work related to product 101 may include performing number of operations 104 within workspace 102 in work environment 100. As used herein, a "number of" items may include one or more items. In this manner, number of operations 104 may include one or more operations. Number of operations 104 may include manufacturing product 101, training human operators using product 101, inspecting product 101, performing maintenance on product 101, repairing product 101, one or more other types of operations involving product 101, or some combination thereof.

When product 101 is to be manufactured in work environment 100, work environment 100 may take the form of a manufacturing environment. Number of operations 104 to be performed within this manufacturing environment may include, for example, without limitation, any number of assembly operations, inspection operations, testing operations, painting operations, sealing operations, drilling operations, fastening operations, repair operations, other types of manufacturing operations, or a combination thereof.

Workspace 102 is a physical workspace. For example, workspace 102 may be the physical space within work environment 100 occupied during the formation of product 101. In some cases, workspace 102 may be a physical space designated for performing the manufacturing of product 101. For example, without limitation, workspace 102 may be a space on top of a work table, a space on a factory floor, a space on top of a platform, or some other type of physical space.

In one illustrative example, product 101 takes the form of an assembly of plurality of components 106. In this example, number of operations 104 may include a number of assembly tasks for assembling plurality of components 106 together to form product 101.

Visualization system 110 is used to visually present virtual environment 108 to one or more human operators during the manufacturing of product 101. Virtual environment 108 is a virtual, or digital, representation of workspace 102. Virtual environment 108 includes virtual product 111. Virtual product 111 is a virtual, or digital, representation of product 101.

Virtual environment 108 and virtual product 111 may be implemented using one or more three-dimensional models, depending on the implementation. These different three-dimensional models may be, for example, without limitation, computer-aided design (CAD) models. Accordingly, visualization system 110 may visually present or display a three-dimensional model of a virtual product 111 or virtual assembly of components, which may be used by a human operator for comparison to a physical product 101 or physical assembly of a plurality of components 106. In other illustrative examples, virtual environment 108 and virtual product 111 may be implemented using one or more two-dimensional models.

Virtual environment 108 may represent the state that workspace 102 is supposed to be in at any stage of the manufacturing of product 101. In this manner, virtual product 111 may represent product 101 at any stage of the manufacturing of product 101. For example, virtual product 111 may represent product 101 prior to number of operations 104 being performed, product 101 after some portion of number of operations 104 have been performed, or product 101 after number of operations 104 have been completed.

Visualization system 110 is used to visually present virtual environment 108 relative to workspace 102. The model of virtual environment 108 exists as a digital representation in controller 120 independently of the existence of the physical workspace 102.

As depicted, visualization system 110 includes output device 114, mounting structure 116, sensor system 118, and controller 120. Output device 114 is any piece of computer hardware equipment used to communicate the results of data processing carried out by controller 120 in a human-comprehensible form of output. This output may be in the form of text, graphics, audio, video, light, or some combination thereof.

In one illustrative example, output device 114 includes display device 124. Display device 124 may take the form of, for example, without limitation, a screen, a monitor, a touch screen, a liquid crystal display (LCD) device, a light emitting diode (LED) display device, a plasma display device, a laser display device, or some other type of display device. Depending on the implementation, output device 114 may also include an audio output device.

In some cases, a number of input devices may be electronically connected to or part of output device 114. For example, a microphone, a touch sensor device, a fingerprint reader, a keyboard, a mouse, a laser pen, some other type of input device, or some combination thereof may be connected to or part of output device 114. For example, display device 124 may have touch screen interface 126. Touch screen interface 126 may allow a human operator to interact with display 122 of virtual product 111 visually presented by display device 124.

Virtual environment 108 may be visually presented relative to workspace 102 to one or more human operators in work environment 100 using output device 114. In particular, virtual environment 108 may be visually presented on display device 124 of output device 114 as display 122. More specifically, view 123 of virtual environment 108 may be visually presented in display 122.

Display device 124 may visually present virtual environment 108 as if virtual environment 108 is being captured through a virtual camera from a particular viewpoint. View 123 of virtual environment 108 visually presented in display 122 may depend on the "angular field of view" for this virtual camera. Changing a viewpoint of the virtual camera, and thereby a viewpoint for virtual environment 108, changes view 123 of virtual environment 108 visually presented in display 122.

The one or more human operators in work environment 100 may use display 122 to perform number of operations 104. For example, a human operator may use display 122 to guide the human operator in assembling plurality of components 106 together to form product 101.

In this illustrative example, mounting structure 116 may be used to move output device 114 relative to workspace 102. Sensor system 118 is used to measure the movement of output device 114 relative to workspace 102. Controller 120 is configured to change view 123 of virtual environment 108 in display 122 based on this movement.

As depicted, output device 114 is associated with mounting structure 116. As used herein, when one component is "associated" with another component, the association is a physical association in the depicted examples. For example, a first component, such as output device 114, may be considered to be associated with a second component, such as mounting structure 116, by being at least one of secured to the second component, bonded to the second component, mounted to the second component, welded to the second component, fastened to the second component, coupled to the second component, or connected to the second component in some other suitable manner. The first component also may be coupled to the second component using a third component. Further, the first component may be considered to be associated with the second component by being formed as part of the second component, an extension of the second component, or both.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Mounting structure 116 may be used to change a location of output device 114 relative to workspace 102. As used herein, a "location" may comprise a position in three-dimensional coordinates, an orientation, or both.

In particular, output device 114 may be moved relative to workspace 102 by moving mounting structure 116. As used herein, moving mounting structure 116 includes moving the entirety of mounting structure 116, moving a portion of mounting structure 116 relative to another portion of mounting structure 116, or both.

Mounting structure 116 may be used to translate output device 114 relative to workspace 102, rotate output device 114 relative to workspace 102, or both. For example, a human operator may manipulate mounting structure 116 to move output device 114 and change at least one of a position or orientation of output device 114 relative to workspace 102. As used herein, "translating" a device means moving the device in a linear direction.

As depicted, mounting structure 116 may be associated with support structure 128. Support structure 128 is used to support mounting structure 116. In one illustrative example, support structure 128 and mounting structure 116 may together be used to move output device 114 relative to workspace 102.

Mounting structure 116, together with support structure 128, may allow output device 114 to move with at least one degree of freedom up to six independent degrees of freedom. These independent degrees of freedom may be provided using any number of redundant degrees of freedom. For example, without limitation, mounting structure 116 may include members that are configured to move with seven or eight degrees of freedom, at least two of which may be redundant degrees of freedom. In other words, the two degrees of freedom may be a same type of translation movement substantially parallel to a particular axis or a same type of rotational movement in a same direction.

Mounting structure 116 may be movable relative to support structure 128. In this illustrative example, mounting structure 116 is movable with at least one degree of freedom relative to support structure 128. For example, mounting structure 116 may be movable with at least one degree of translational freedom up to three independent degrees of translational freedom relative to support structure 128. Moving mounting structure 116 relative to support structure 128 also moves output device 114 associated with mounting structure 116. For example, translating mounting structure 116 in a particular direction causes a same translational movement of output device 114.

Support structure 128 and mounting structure 116 may be implemented in different ways. In one illustrative example, support structure 128 may include number of rails 132. Mounting structure 116 may be movable along number of rails 132. In particular, mounting structure 116 may be translated along number of rails 132. Thus, mounting structure 116 may move relative to number of rails 132 with at least one degree of translational freedom.

In one illustrative example, mounting structure 116 may include articulated structure 130. Articulated structure 130 may be a structure that includes two or more members connected by at least one rotational joint. Articulated structure 130 may include any number of rotational joints. Each rotational joint may allow a different type of rotational movement. In this illustrative example, articulated structure 130 may allow output device 114 to be moved with at least one degree of rotational freedom up to three independent degrees of rotational freedom. For example, two rotational joints may allow a same type of rotation at two different positions along articulated structure 130 but may together provide only one independent degree of rotational freedom.

Sensor system 118 measures the movement of output device 114 and generates sensor data 135 based on these measurements. For example, sensor system 118 may measure the movement of output device 114 by measuring at least one of the movement of mounting structure 116 relative to support structure 128, the movement of a portion of mounting structure 116 relative to another portion of mounting structure 116, or some other type of movement.

In this illustrative example, sensor system 118 includes number of sensor devices 134. Number of sensor devices 134 may be associated with at least one of support structure 128 or mounting structure 116. Sensor device 136 may be an example of one of number of sensor devices 134. Sensor device 136 may be associated with support structure 128, mounting structure 116, or both, depending on the implementation.

Sensor device 136 may be configured to measure at least one of translational movement or rotational movement. Sensor device 136 may take a number of different forms. As one illustrative example, sensor device 136 may take the form of first encoder 137 or second encoder 138.

First encoder 137 may be any encoder configured for use in measuring linear displacement. For example, first encoder 137 may measure at least one of translational movement or rotational movement for use in measuring linear displacement. In other words, first encoder 137 may be used to measure a change in linear position. Second encoder 138 may be any encoder configured for use in measuring angular displacement. In particular, second encoder 138 may measure rotational movement for use in measuring angular displacement.

Although sensor device 136 is described as taking the form of one of first encoder 137 or second encoder 138, sensor device 136 may take other forms. For example, sensor device 136 may take the form of a rotational potentiometer, a linear potentiometer, a string encoder, a string potentiometer, a laser range meter, a linear variable differential transducer (LVDT), or some other type of sensor device.

Sensor system 118 sends sensor data 135 to controller 120 for processing. In this illustrative example, controller 120 may be implemented using software, hardware, firmware, or a combination thereof. When software is used, the operations performed by controller 120 may be implemented using, for example, without limitation, program code configured to run on a processor unit. When firmware is used, the operations performed by controller 120 may be implemented using, for example, without limitation, program code and data and stored in persistent memory to run on a processor unit.

When hardware is employed, the hardware may include one or more circuits that operate to perform the operations performed by controller 120. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by controller 120 may be performed using organic components integrated with inorganic components. In some cases, the operations and processes may be performed by entirely organic components, excluding a human being. As one illustrative example, circuits in organic semiconductors may be used to perform these operations and processes.

Controller 120 may be implemented as part of output device 114 in this illustrative example. In other illustrative examples, controller 120 may be implemented as a separate component. For example, controller 120 may be implemented using a computer system configured to communicate with output device 114 using any number of wired communications links, wireless communications links, optical communications links, other type of communications links, or combination thereof.

Controller 120 may be configured to receive sensor data 135 from sensor system 118. In one illustrative example, controller 120 may include a data acquisition interface capable of receiving sensor data 135 and converting sensor data 135 into a form readable by controller 120. The data acquisition interface may be implemented using hardware, software, or both.

Controller 120 uses sensor data 135 that has been converted into the readable form to control display 122 of virtual product 111 in virtual environment 108. In particular, controller 120 processes sensor data 135 in the readable form to change view 123 of virtual environment 108 visually presented in display 122 in correspondence with the movement of output device 114 relative to workspace 102.

Before controller 120 can properly control display 122 of and change view 123 of virtual environment 108, a virtual-to-physical alignment between virtual environment 108 and workspace 102 may need to be performed. In particular, virtual environment 108 needs to be aligned with workspace 102.

This alignment process may include aligning a set of virtual features in virtual environment 108 with a corresponding set of physical features in workspace 102. As used herein, a "set of" items may include one or more items. In this manner, a set of features may include one or more features.

A physical feature in workspace 102 may be, for example, a feature of a component in plurality of components 106 or some other feature of workspace 102. For example, plurality of components 106 may include a base structure that is to be placed on top of a table for performing number of operations 104. The top face of the table and the physical space above this top face may form workspace 102. A physical feature in this type of workspace may take the form of, for example, without limitation, a point along an edge of the top face of the table, a top corner of the table, a corner of the base structure, a marked point on the base structure, or some other type of feature on the base structure. The corresponding virtual feature in virtual environment 108 may be the virtual, or digital, representations of the physical feature.

In one illustrative example, the set of physical features and the set of virtual features to be aligned may be known or preselected. Alignment system 141 is used to locate the set of physical features in workspace 102. As used herein, "locating" the set of physical features may include physically locating, or identifying, the set of physical features. In some illustrative examples, a human operator may use alignment system 141 to locate the set of physical features in workspace 102.

For example, the human operator may use alignment system 141 to point to, mark, or provide some other type of visual indicator for a physical feature in workspace 102. Alignment system 141 may take a number of different forms. Alignment system 141 may include at least one of a laser pointer device, a laser range meter, an extension probe, a plumb bob, an optical sighting device, a video camera with crosshair reticule, or some other type of device.

In one illustrative example, alignment system 141 includes laser device 144. Laser device 144 may be associated with at least one of mounting structure 116 or output device 114. Output device 114 may be moved relative to workspace 102 using at least one of mounting structure 116 or support structure 128 until the laser beam emitted by laser device 144 coincides with or points to a preselected physical feature in workspace 102. This process may be repeated to locate each of the set of physical features preselected for workspace 102.

Controller 120 uses sensor data 135 generated by sensor system 118 for the set of physical features located by the human operator to define a number of reference axes 142 for workspace 102. Number of reference axes 142 may be used to define a coordinate system for workspace 102. In some cases, number of reference axes 142 may be used in combination with additional known information to define this coordinate system for workspace 102.

In other illustrative examples, the coordinate system for workspace 102 may be defined using three calibration points that are non-collinear and three-dimensional localization software implemented within controller 120. These three calibration points may have known positions with respect to the coordinate system for at least one of workspace 102 or product 101 as determined from a three-dimensional computer-aided design (3-D CAD) model or some other measurement technique.

Controller 120 computes transformation matrix 143 needed to align the coordinate system defined for workspace 102 to a coordinate system for virtual environment 108. Transformation matrix 143 is a mathematical representation in the form of a homogeneous transformation matrix. A homogenous transformation matrix may be used to convert location data between frames of reference. In this illustrative example, these frames of reference may be the coordinate system for workspace 102 and the coordinate system for virtual environment 108. Thus, transformation matrix 143 is used to convert location data between the coordinate system for workspace 102 and the coordinate system for virtual environment 108. These coordinate systems may be two-dimensional coordinate systems or three-dimensional coordinate systems, depending on the implementation.

Further, controller 120 may also need to compute set of scale factors 145 for use in scaling sensor data 135. As used herein, a "set of" items may include one or more items. In this manner, set of scale factors 145 may include one or more scale factors.

Set of scale factors 145 may be used to improve an accuracy of the alignment of virtual environment 108 and workspace 102. In particular, set of scale factors 145 may be used to take into account any differences in at least one of the scaling of or units used for the coordinate systems for virtual environment 108 and workspace 102.

Each of set of scale factors 145 may be a linear scale factor. In one illustrative example, each of set of scale factors 145 may correspond to a particular one of number of reference axes 142. In other words, controller 120 may compute a scale factor for each of number of reference axes 142. In other illustrative examples, set of scale factors 145 may include a scale factor for at least one of the axes used to define the coordinate system for workspace 102. Set of scale factors 145 and transformation matrix 143 may together be used by controller 120 to determine the corresponding change in view 123 of virtual environment 108 in display 122 for any change in the location of output device 114 relative to workspace 102.

For example, when output device 114 is moved relative to workspace 102, controller 120 uses sensor data 135 generated by sensor system 118 measuring this movement to compute at least one of a linear displacement or angular displacement of output device 114 relative to workspace 102 with respect to the coordinate system for workspace 102. Controller 120 then uses transformation matrix 143 and set of scale factors 145 to determine the corresponding linear displacement and angular displacement with respect to the coordinate system for virtual environment 108. Controller 120 changes the viewpoint for virtual environment 108 to change view 123 of virtual environment 108 in display 122 in correspondence with the movement of output device 114 relative to workspace 102.

In some illustrative examples, controller 120 may be configured to perform a number of actions when output device 114 has been moved to a preselected location. For example, controller 120 may use sensor data 135 to determine whether output device 114 is in a preselected location relative to workspace 102 based on sensor data 135. In response to a determination that output device 114 is in the preselected location, controller 120 may perform a number of actions, one or more of which may include changing display 122.

For example, without limitation, when controller 120 determines that output device 114 has been moved to some preselected location, controller 120 may implement a response action, which may include at least one of: add instructions corresponding to that preselected location to the display, play an audio recording of instructions or warnings, play a video on another portion of output device 114, visually present a new virtual element in display 122, change the state of existing virtual elements in virtual environment 108 in display 122, send a signal to another application implemented using controller 120, send data to another computer system over a communications link, write data to a file, or perform some other type of action. Accordingly, controller 120 may provide a visual or audio response to assist a human operator with the assembly sequence for plurality of components 106.

In some illustrative examples, these types of discrete actions may be performed once per session when output device 114 moves to a specific location. In other examples, these actions may be performed every time output device 114 is moved into a preselected location. These discrete actions may also launch other actions that require feedback from the human operator. For example, feedback such as the pressing of a button, audio feedback, or other some other type of user feedback may be required.

Controller 120 may also control display 122 based on input received through an input device or input interface. In some cases, the input may be entered by a human operator through, for example, touch screen interface 126. In other illustrative examples, the input may be received through some other type of input device, such as a keyboard, a microphone, or a gesture interface. In some cases, controller 120 may be configured to react to a signal received from another application by changing some aspect of virtual environment 108 or how visualization system 110 operates.

Depending on the type of input received, controller 120 may add virtual labels to virtual product 111 in display 122, add notes to display 122, add content to display 122, remove content from display 122, change a color of some portion of display 122, zoom into view 123 of virtual environment 108, zoom out of view 123 of virtual environment 108, split display 122, perform some other action, or perform some combination thereof.

In this manner, visualization system 100 may improve the efficiency with which work is performed within workspace 102. For example, controller 120 may play an audio recording containing instructions for performing a drilling operation when the human operator moves output device 114 to a preselected location relative to product 101 in workspace 102 using mounting structure 116. The human operator may then be able to perform the drilling operation with the guidance of the instructions in the audio recording without having to refer to a manual or some other source for the instructions. Further, support structure 128 from FIG. 1 allows output device 114 to be positioned above product 101 and out of the way of the human operator, while the human operator performs the drilling operation.

As depicted, visualization system 110 may also include lighting device 146. Lighting device 146 may be associated with at least one of mounting structure 116, output device 114, or support structure 128. Lighting device 146 may illuminate a portion of workspace 102 to aid a human operator in performing number of operations 104.

In one illustrative example, the operation of lighting device 146 may be controlled by controller 120. For example, controller 120 may control the turning on and turning off of lighting device 146 based on the position of output device 114 relative to workspace 102.

The illustration of work environment 100 and visualization system 110 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, output device 114 may not be configured to be positioned above workspace 102. Rather, output device 114 may be positioned using mounting structure 116 such that display 122 is positioned relative to one or more of plurality of components 106 within workspace 102.

In some illustrative examples, output device 114 may be configured to visually present virtual product 111 in virtual environment 108 as a collocated representation of product 101 in workspace 102. In other words, virtual product 111 may be a collocated representation of product 101 that may be positioned overlapping or coinciding with one or more of plurality of components 106 or product 101 within workspace 102. For example, the coordinate system of virtual environment 108 may be made to coincide with the coordinate system for workspace 102, instead of being offset in some direction of the coordinate system for workspace 102, such as a vertical offset.

In other illustrative examples, output device 114 may take the form of a holographic system configured to visually present display 122 as a hologram relative to workspace 102. In this manner, virtual environment 108 may take the form of a holographic environment in these examples.

Figure 2:
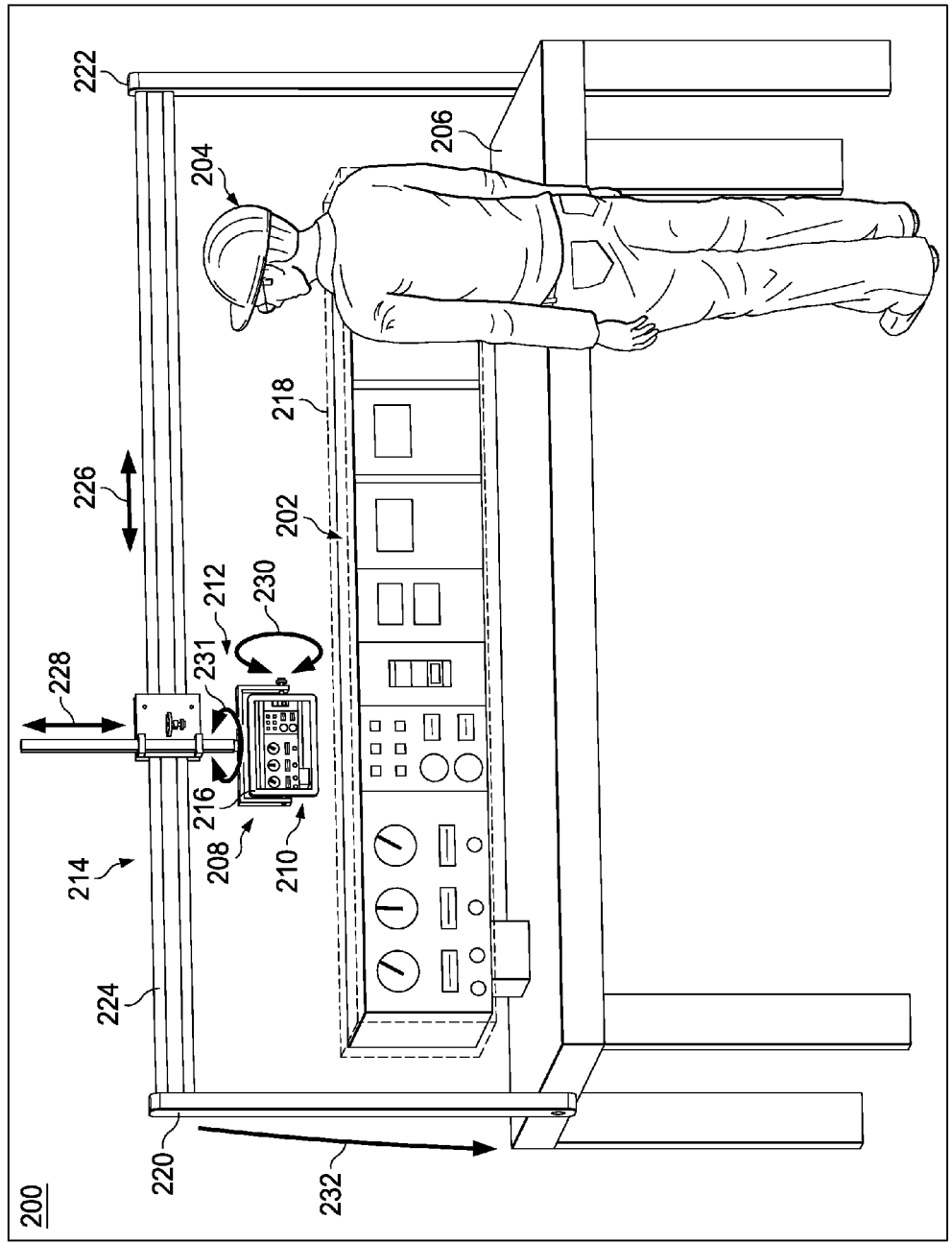
FIG. 2 is an illustration of an isometric view of a manufacturing environment in accordance with an illustrative embodiment.

With reference now to FIG. 2, an illustration of an isometric view of a manufacturing environment is depicted in accordance with an illustrative embodiment. Manufacturing environment 200 may be an example of one implementation for work environment 100 in FIG. 1. As depicted, manufacturing environment 200 includes product 202.

Product 202 may be an example of one implementation for product 101 in FIG. 1. Product 202 may be a partially completed product in this illustrative example. In particular, product 202 may not yet include all of the components that will make up the final form of product 202. Operator 204 is a human operator present within manufacturing environment 200 and may perform a number of operations on product 202 to form a final form of product 202. In this illustrative example, product 202 is positioned on table 206 for operator 204 to perform these operations.

The physical space on and above table 206 forms workspace 218. Workspace 218 may be an example of one implementation for workspace 102 in FIG. 1.

Visualization system 208 is also present within manufacturing environment 200. Visualization system 208 may be an example of one implementation for visualization system 110 in FIG. 1. Visualization system 208 includes output device 210, mounting structure 212, and support structure 214. Output device 210, mounting structure 212, and support structure 214 may be examples of implementations for output device 114, mounting structure 116, and support structure 128, respectively, in FIG. 1.

Visualization system 208 is used to visually present a virtual environment that includes a virtual product representing product 202 to operator 204 on screen 216 of output device 210. Visualization system 208 visually presents a view of this virtual environment relative to workspace 218. The view may include all or only a portion of the virtual environment. Thus, the view may include all or only a portion of the virtual product.

Screen 216 may include a touch screen interface in this illustrative example. This virtual product is the virtual representation of the product to be formed using product 202.

As depicted, mounting structure 212 and support structure 214 may be used to move output device 210 relative to workspace 218. In this illustrative example, output device 210 is positioned above product 202 and above workspace 218.

Support structure 214 includes member 220, member 222, and rail 224. Rail 224 is fixedly attached to member 220 and member 222.

Member 220 and member 222 are used to elevate rail 224 above product 202 such that mounting structure 212 and output device 210 associated with mounting structure 212 are elevated above product 202. In this manner, support structure 214 may form a gantry-style structure. By keeping output device 210 above product 202, output device 210 may avoid interfering with the operations being performed by operator 204.

Mounting structure 212 may be configured to allow output device 210 to be moved relative to workspace 218, and thereby product 202, with at least one degree of freedom. In this illustrative example, mounting structure 212 allows output device 210 to move with two independent degrees of translational freedom and two independent degrees of rotational freedom. In particular, output device 210 may be translated in the direction of arrow 226 and in the direction of arrow 228 relative to product 202. Further, output device 210 may be rotated relative to product 202 in the direction of arrow 230 and arrow 231. Mounting structure 212 is described in greater detail in FIG. 3 below.

As depicted, member 220 and member 222 are movably connected to table 206. In particular, member 220 and member 222 may be rotated in the direction of arrow 232 relative to table 206. In this manner, support structure 214 and mounting structure 212 may be stowed away when not in use.

Figure 3:
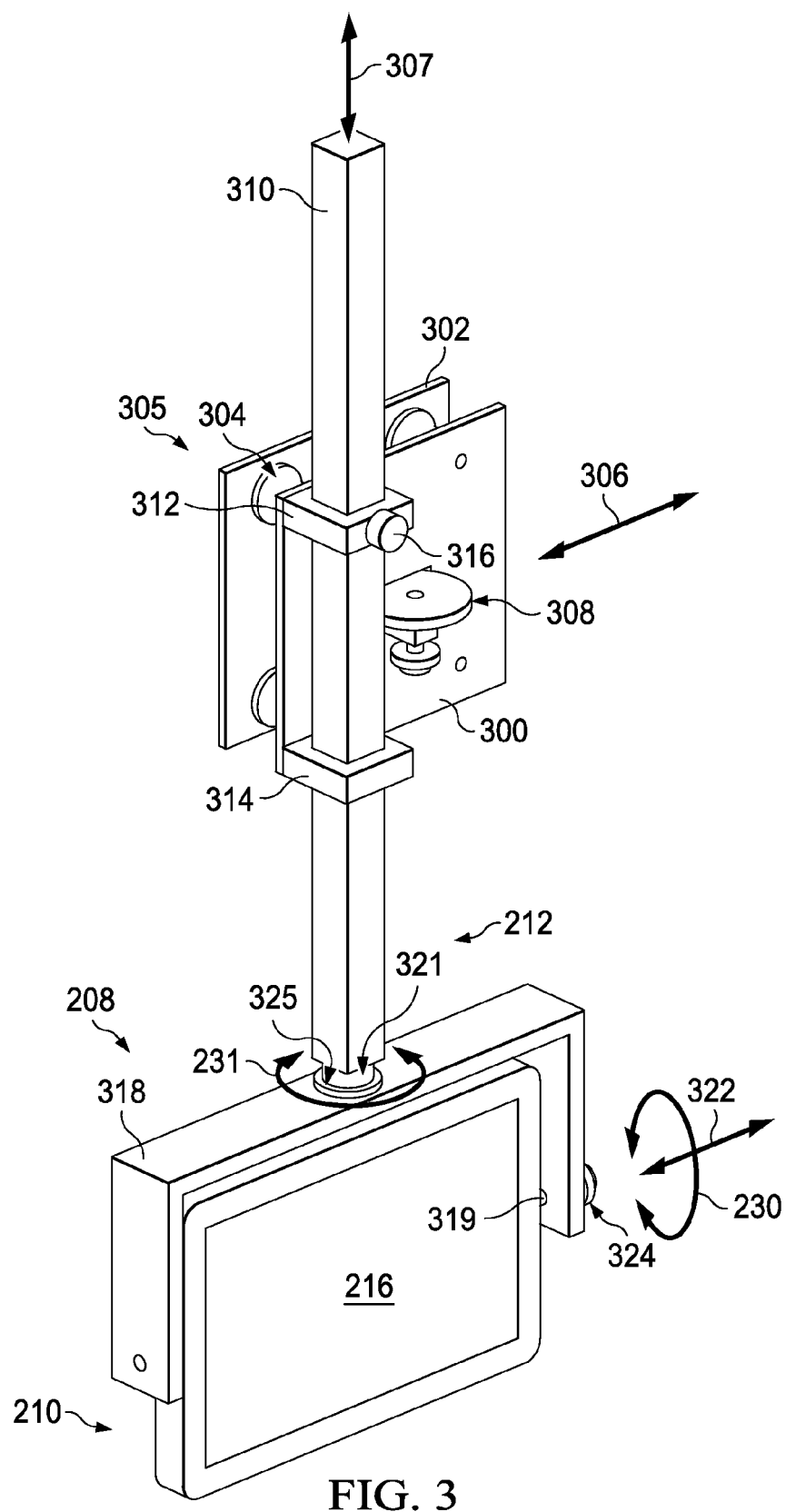
FIG. 3 is an illustration of an isometric view of a mounting structure in accordance with an illustrative embodiment.

With reference now to FIG. 3, an illustration of an isometric view of mounting structure 212 from FIG. 2 is depicted in accordance with an illustrative embodiment. In this illustrative example, mounting structure 212 includes plate 300, plate 302, and wheels 304.

Plate 300, plate 302, and wheels 304 together form attachment element 305 that may be used to attach mounting structure 212 to support structure 214 in FIG. 2. Wheels 304 are associated with plate 300 and plate 302. Wheels 304 are configured to move along rail 224 in FIG. 2.

Encoder 308 is associated with attachment element 305. Encoder 308 generates sensor data for use in computing the linear displacement of attachment element 305. Encoder 308 is an example of one implementation of first encoder 137 in FIG. 1. In this illustrative example, encoder 308 measures angular rotation for use in computing the linear displacement of attachment element 305. This computation may be performed using kinematics.

As depicted, mounting structure 212 also includes translatable member 310, retaining element 312, and retaining element 314. Translatable member 310 may be linearly moved relative to attachment element 305 such that mounting structure 212 may be linearly moved relative to support structure 214 in FIG. 2.

Retaining element 312 and retaining element 314 hold translatable member 310 in a fixed orientation relative to attachment element 305. Translatable member 310 may be slid through retaining element 312 and retaining element 314 in a direction substantially parallel to axis 307. In particular, translatable member 310 may allow translation of mounting structure 212 in a direction substantially parallel to axis 307.

Encoder 316 is associated with translatable member 310. Encoder 316 is another example of one implementation of first encoder 137 in FIG. 1. Encoder 316 measures angular rotation for use in computing the linear displacement of translatable member 310.

As depicted, mounting structure 212 further includes retaining member 318, which holds output device 210. Retaining member 318 is attached to translatable member 310 such that any movement of attachment element 305 along rail 224 in FIG. 2 causes a same movement of translatable member 310, retaining member 318, and thereby output device 210. Similarly, any movement of translatable member 310 causes a same movement of retaining member 318 and thereby, output device 210.

Output device 210 is associated with mounting structure 212 by being attached to retaining member 318. Retaining member 318 is attached to translatable member 310 of mounting structure 212 by rotational joint 321 in this illustrative example. Rotational joint 321 rotates about axis 307 in the direction shown by arrow 231. In this manner, output device 210 may be rotated about axis 307 in the direction of arrow 231 by rotating retaining member 318 in the direction of arrow 231 about axis 307.

Encoder 325 is attached to at least one of retaining member 318 or rotational joint 321. Encoder 325 may be an example of one implementation of second encoder 138 in FIG. 1. Encoder 325 measures the angular rotation of retaining member 318 relative to translatable member 310 for use in providing the angular displacement of retaining member 318, and thereby, output device 210 held by retaining member 318.

Further, output device 210 may be movably attached to retaining member 318 through rod 319. Rod 319 may be considered part of retaining member 318 in this illustrative example. Rod 319 may be rotated in the direction of arrow 230 about axis 322 relative to output device 210. Thus, output device 210 may be rotated about axis 307 and about axis 322. Axis 307 and axis 322 are substantially orthogonal axes.

In this manner, mounting structure 212 allows output device 210 to be moved relative to product 202 with at least two independent degrees of translational freedom and two independent degrees of rotational freedom. Consequently, output device 210 may be movable with a total of four independent degrees of freedom, in this illustrative example.

Encoder 324 is associated with retaining member 318 by being attached to at least one of rod 319 or some other component of retaining member 318. Encoder 324 is another example of one implementation for second encoder 138 in FIG. 1. Encoder 324 measures the angular rotation of rod 319 relative to the rest of retaining member 318 to generate sensor data for use in providing the angular displacement of rod 319, and thereby output device 210 attached to rod 319.

The sensor data generated by encoder 308, encoder 316, encoder 324, and encoder 325 may be sent to a controller, such as controller 120 in FIG. 1, for processing. In particular, the data may be sent to a data acquisition interface that is part of this controller. In this illustrative example, the controller is part of output device 210. However, in other illustrative examples, the controller may be a separate component that is connected to output device 210 through a communications link.

The controller uses the sensor data generated by encoder 308, encoder 316, encoder 324, and encoder 325, along with a kinematics process, to generate the viewpoint information needed to change the view of the virtual environment displayed on screen 216 in correspondence with the movement of output device 210 relative to workspace 218 and product 202 in workspace 218. In one illustrative example, the kinematics process may take the form of a forward kinematics process. The forward kinematics process may use the kinematics equations of visualization system 208 to compute the Cartesian coordinate position data for output device 210. In particular, the process may use the physical geometric configuration of mounting structure 212, and in some cases support structure 214, along with the measurements of the joint variables, to produce Cartesian coordinate position data for a location of a center of screen 216.

In one illustrative example, if the controller determines that translatable member 310 has been linearly displaced upwards by about 1 inch relative to workspace 218, the controller may change the viewpoint from which the view of the virtual environment is displayed on screen 216. In this manner, the view of the virtual environment, and thereby the virtual product representing product 202 displayed on screen 216, may be changed.

Figure 4:
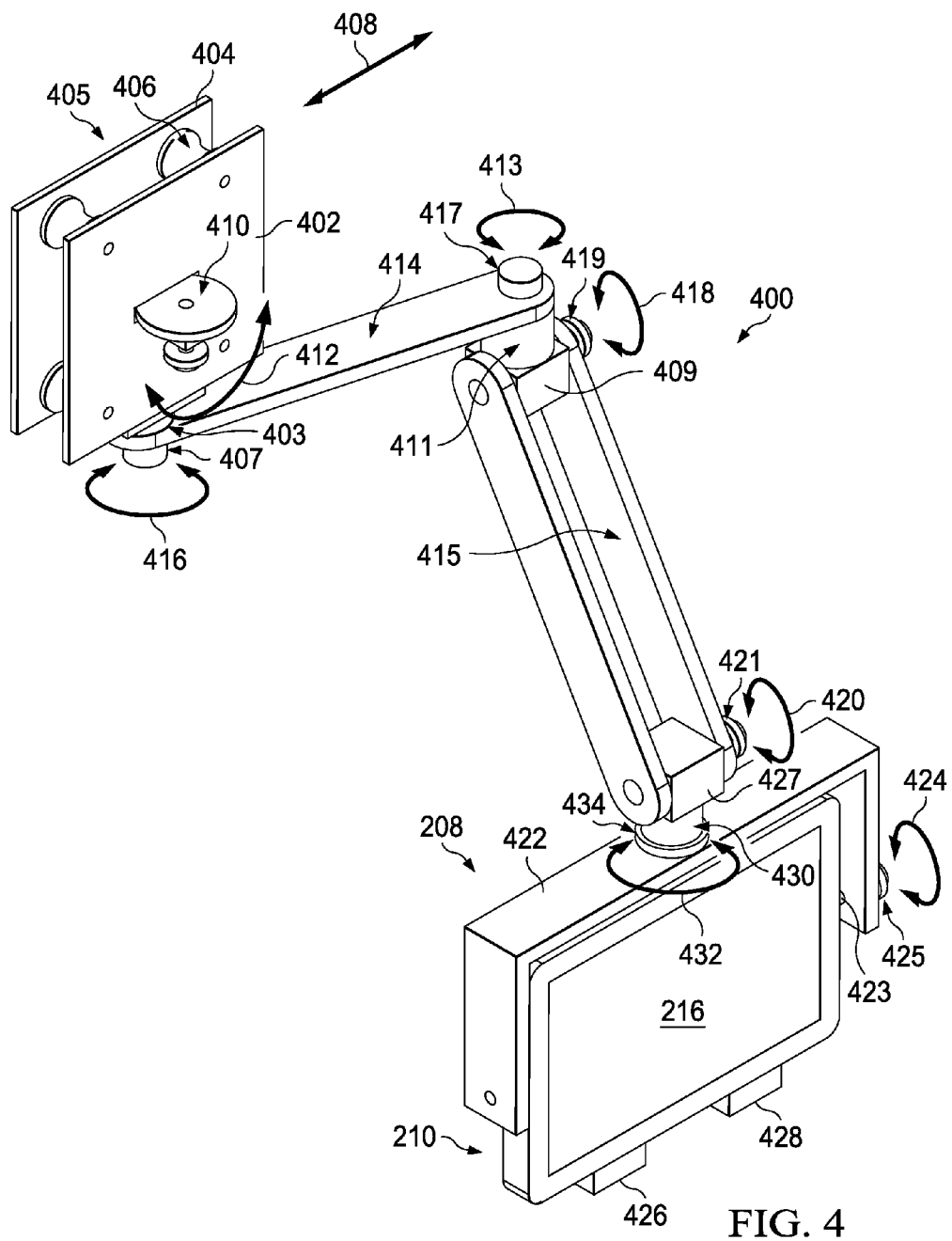
FIG. 4 is an illustration of an isometric view of a different type of mounting structure in accordance with an illustrative embodiment.

Turning now to FIG. 4, an illustration of an isometric view of a different type of mounting structure is depicted in accordance with an illustrative embodiment. Mounting structure 400 may be used in visualization system 208 instead of mounting structure 212 in FIG. 2. Mounting structure 400 may be movably attached to support structure 214 in FIG. 2. Further, mounting structure 400 may be used to hold output device 210 from FIG. 2.

As depicted, mounting structure 400 includes plate 402, plate 404, and wheels 406. Plate 402, plate 404, and wheels 406 are implemented in a manner similar to plate 300, 302, and wheels 304, respectively, in FIG. 3 above. Plate 402, plate 404, and wheels 406 may together form attachment element 405.

Further, movement device 410 may be used to move attachment element 405 along rail 224 in FIG. 2 in the direction of arrow 408 in a manner similar to the way in which encoder 308 is used to move attachment element 305 in FIG. 3. Rotation of movement device 410 in the direction of arrow 412 causes movement of attachment element 405 in the direction of arrow 408.

Mounting structure 400 includes member 414 in this illustrative example. Member 414 may be rotatably connected to attachment element 405 through rotational joint 403. In particular, member 414 may be rotated in the direction of arrow 416 relative to attachment element 405. Member 414 may function in a manner of a swing arm in this illustrative example. The angular rotation of member 414 relative to attachment element 405 is measured using encoder 407.

Further, element 409 may be rotatably connected to member 414 through rotational joint 411. Element 409 may be rotated relative to member 414 in the direction of arrow 413. Encoder 417 may be used to measure the angular rotation of element 409 relative to member 414.

Arm 415 is rotatably connected to element 409. Arm 415 may be rotated in the direction of arrow 418 relative to element 409. Encoder 419 may be used to measure the angular rotation of arm 415 relative to element 409. Arm 415 may also be rotatably connected to element 427. Element 427 may be rotated in the direction of arrow 420 relative to arm 415. Encoder 421 may be used to measure the angular rotation of element 427 relative to arm 415.

Retaining member 422 is attached to element 427 through rotational joint 430. Retaining member 422 may be rotated in the direction of arrow 432 relative to element 427. Encoder 434 may be used to measure the angular rotation of retaining member 422 relative to element 427.

As depicted, retaining member 422 holds output device 210. In particular, output device 210 is movably attached to retaining member 422 through rod 423. Rod 423, and thereby output device 210, may be rotated in the direction of arrow 424 relative to retaining member 422. Encoder 425 measures the angular rotation of rod 423 in the direction of arrow 424 relative to retaining member 422.

In other illustrative examples, a mechanism may be used to keep element 409 and element 427 substantially parallel to each other. In this manner, the angular rotations of arm 415 relative to element 409 and element 427 may be substantially identical. In these examples, only one of encoder 419 and encoder 421 may be needed to measure the angular rotation of arm 415.

Laser device 426 and lighting device 428 are attached to output device 210 in this illustrative example. Laser device 426 and lighting device 428 are examples of implementations for laser device 144 and lighting device 146, respectively, in FIG. 1.

Figure 5:
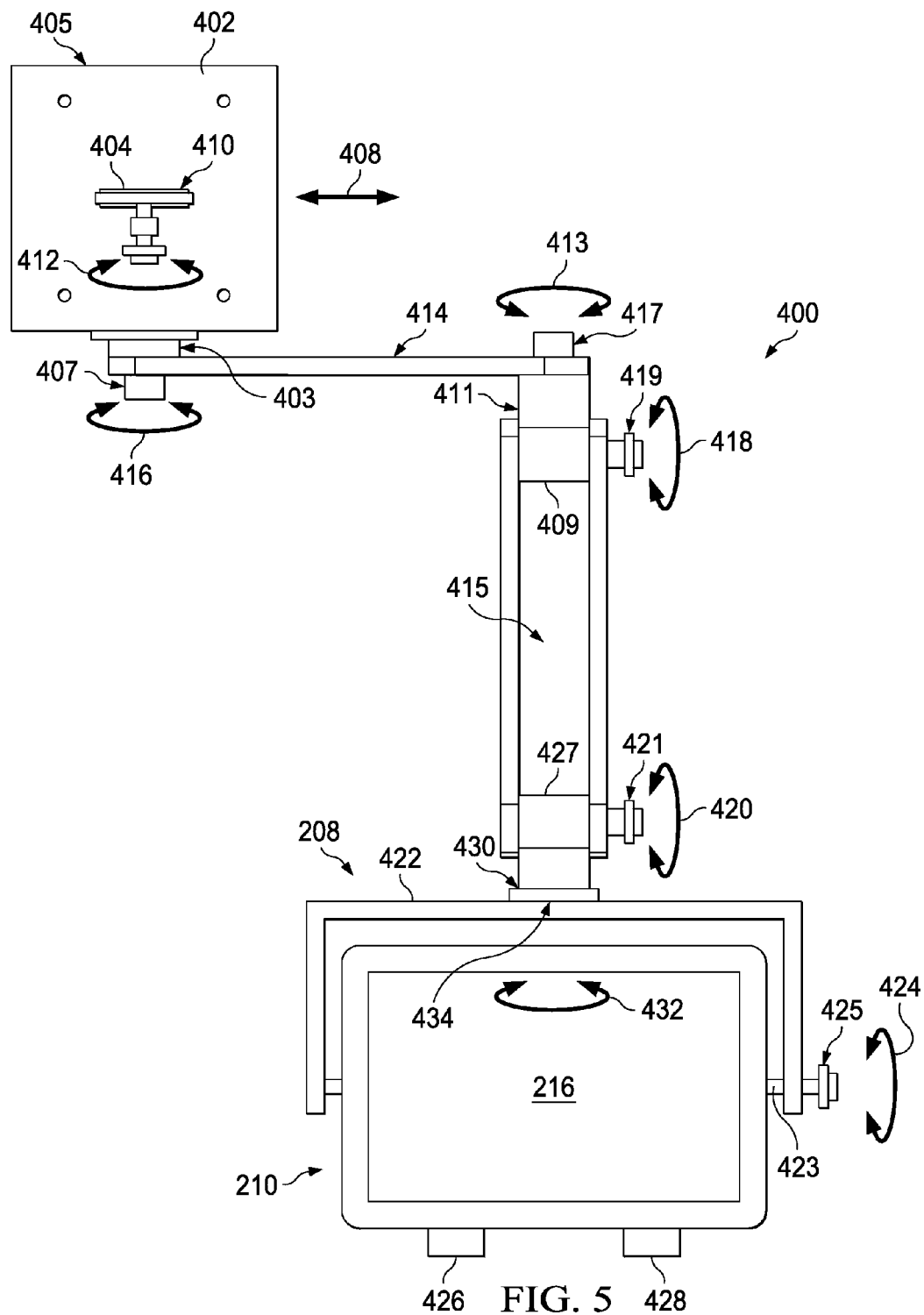
FIG. 5 is an illustration of a front view of a mounting structure with an output device in accordance with an illustrative embodiment.

With reference now to FIG. 5, an illustration of a front view of mounting structure 212 with output device 210 is depicted in accordance with an illustrative embodiment. Rod 423 may be more clearly seen in this illustrative example. Further, encoder 419, encoder 421, and encoder 425 may be more clearly seen.

Figure 6:
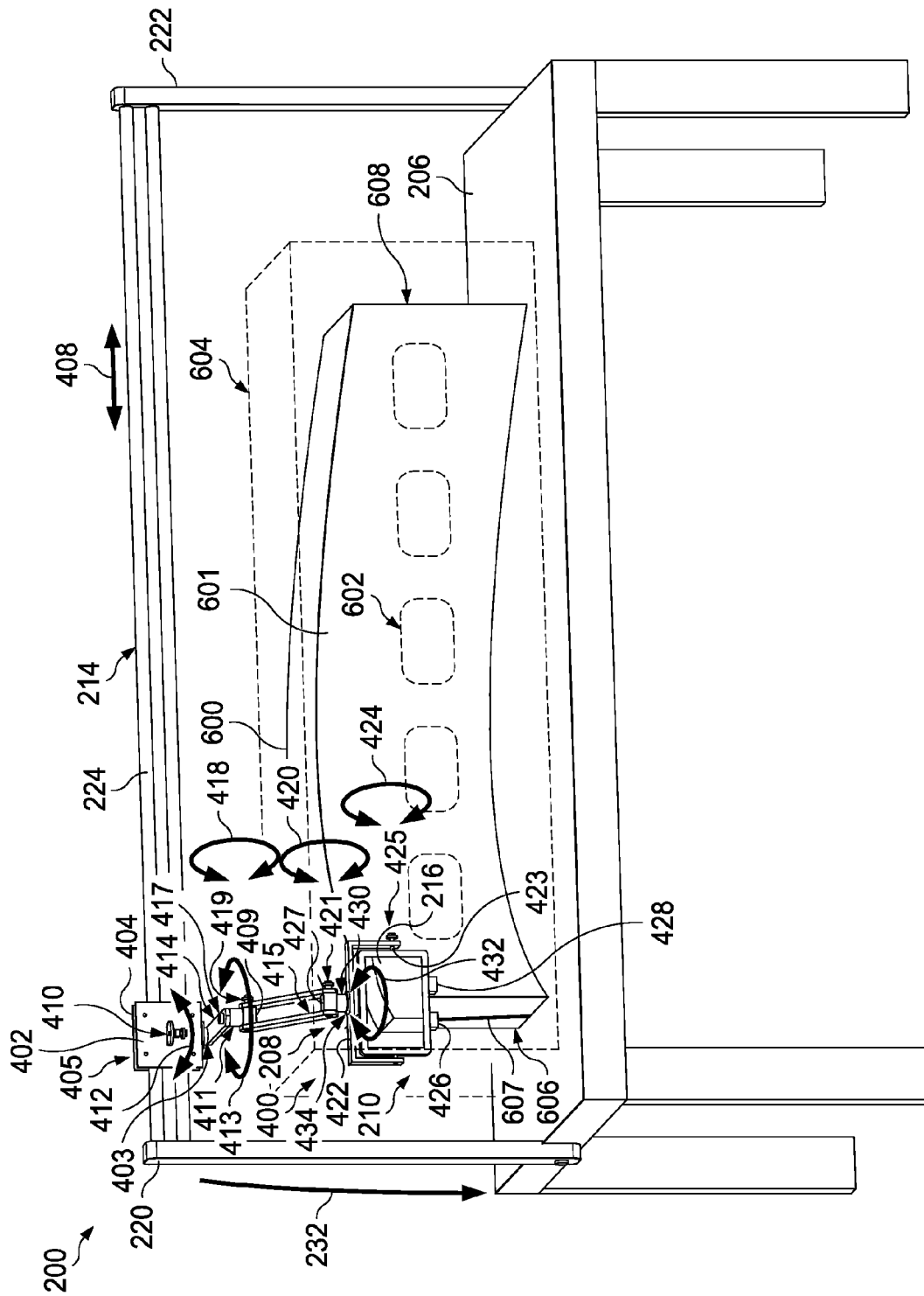
FIG. 6 is an illustration of a manufacturing environment with a visualization system using a mounting structure in accordance with an illustrative embodiment.

With reference now to FIG. 6, an illustration of manufacturing environment 200 from FIG. 2 with visualization system 208 using mounting structure 400 from FIG. 4 is depicted in accordance with an illustrative embodiment. In this illustrative example, mounting structure 400 from FIG. 4 has been movably attached to rail 224.

As depicted, product 600 is positioned on table 206. Product 600 may be an example of one implementation for product 101 in FIG. 1. Product 600 is only partially assembled in this illustrative example. Product 600 may include component 601. Component 601 may be an example of one of plurality of components 106 in FIG. 1.

Component 601 may have plurality of locations 602 at which operations are to be performed. For example, each of plurality of locations 602 may be a location at which a particular type of component is to be installed. A plurality of components may be added to plurality of locations 602 on component 601 to complete assembly of product 600.

Workspace 604 may be the physical space in manufacturing environment 200 occupied by product 600 and designated for performing operations on product 600. Mounting structure 400 is used to position output device 210 relative to product 600 within workspace 604. Mounting structure 400 may position output device 210 within, partially within, or completely outside of workspace 604, depending on the implementation.

In this illustrative example, prior to any operations being performed, a set of physical features may be located for use in aligning workspace 604 with a virtual environment. A human operator may locate, or identify, the set of physical features using laser device 426 as a guide to help with the alignment process.

For example, without limitation, mounting structure 400 may be moved along rail 224 to position output device 210 relative to first edge 606 of product 600. Laser device 426 is used to emit laser beam 607. Mounting structure 400 is used to adjust the position of output device 210 relative to product 600 until laser beam 607 encounters, or coincides, with a first preselected physical feature. This first preselected physical feature may be first edge 606 in this illustrative example. The position in three-dimensional coordinates of the point at which laser beam 607 coincides with first edge 606 may be computed by the controller based on the sensor data generated by one or more of the encoders associated with mounting structure 400.

Mounting structure 400 is then used to move output device 210 towards a second preselected physical feature. This second preselected physical feature may be second edge 608 of product 600 in this illustrative example.

Figure 7:
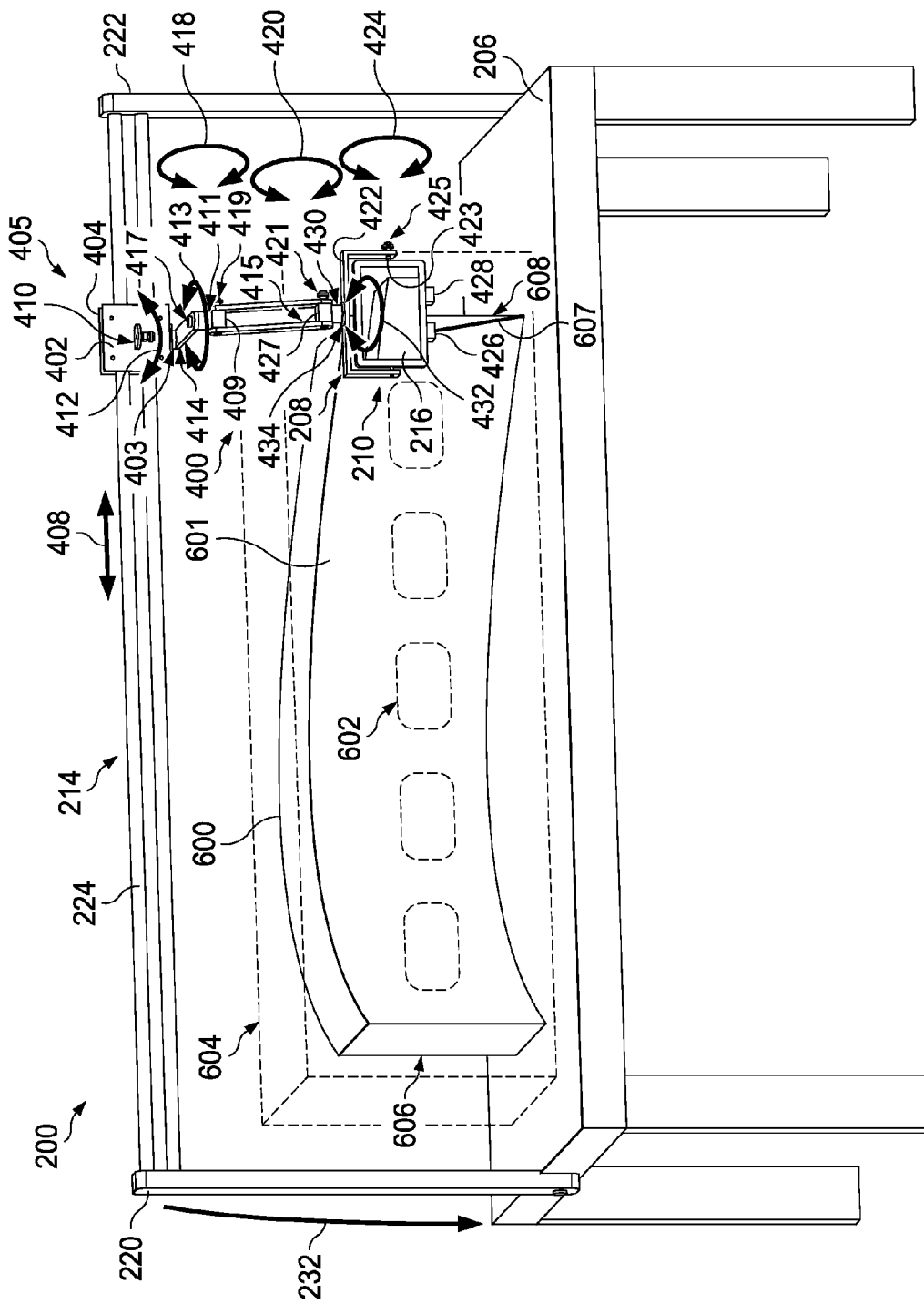
FIG. 7 is an illustration of a manufacturing environment with a visualization system using a mounting structure in accordance with an illustrative embodiment.

With reference now to FIG. 7, an illustration of manufacturing environment 200 from FIG. 2 with visualization system 208 using mounting structure 400 from FIG. 4 is depicted in accordance with an illustrative embodiment. As depicted, mounting structure 400 has been used to move output device 210 near second edge 608 of product 600.

Mounting structure 400 is then used to adjust the position of output device 210 relative to product 600 until laser beam 607 encounters, or coincides, with second edge 608. The position in three-dimensional coordinates of the point at which laser beam 607 coincides with second edge 608 may be computed by the controller based on the sensor data generated by one or more of the encoders associated with mounting structure 400.

The position of the first point identified on first edge 606 in FIG. 6 above and the position of the second point identified on second edge 608 may be used by the controller to determine a reference axis for workspace 604.

This reference axis may be a reference X-axis. A known axis substantially vertical to table 206 may be set as a reference Y-axis. Together, the reference X-axis and the reference Y-axis may be used to establish a coordinate system for workspace 604. In some cases, the human operator may manipulate the mounting structure 400 to move laser beam 607 emitted by laser device 426 to other locations to locate other physical features in workspace 604. The positions of these physical features may be computed by the controller using the sensor data. These positions may be used to determine at least one of the reference Y-axis, a reference Z-axis, or both. In this manner, the coordinate system for workspace 604 may be established using at least two reference axes.

The controller then computes the transformation matrix and the set of scale factors for aligning the coordinate system for workspace 604 and a coordinate system for the virtual environment to be visually presented on screen 216. This alignment allows the controller to change the view of the virtual environment displayed on screen 216 in correspondence with any movement of output device 210 relative to workspace 604. In particular, when the controller determines a linear displacement and angular displacement of output device 210 with respect to the coordinate system for workspace 604, the controller uses the transformation matrix and the set of scale factors computed to change the view of the virtual environment displayed on screen 216 by a corresponding linear displacement and angular displacement with respect to the coordinate system for the virtual environment.

Figure 8:
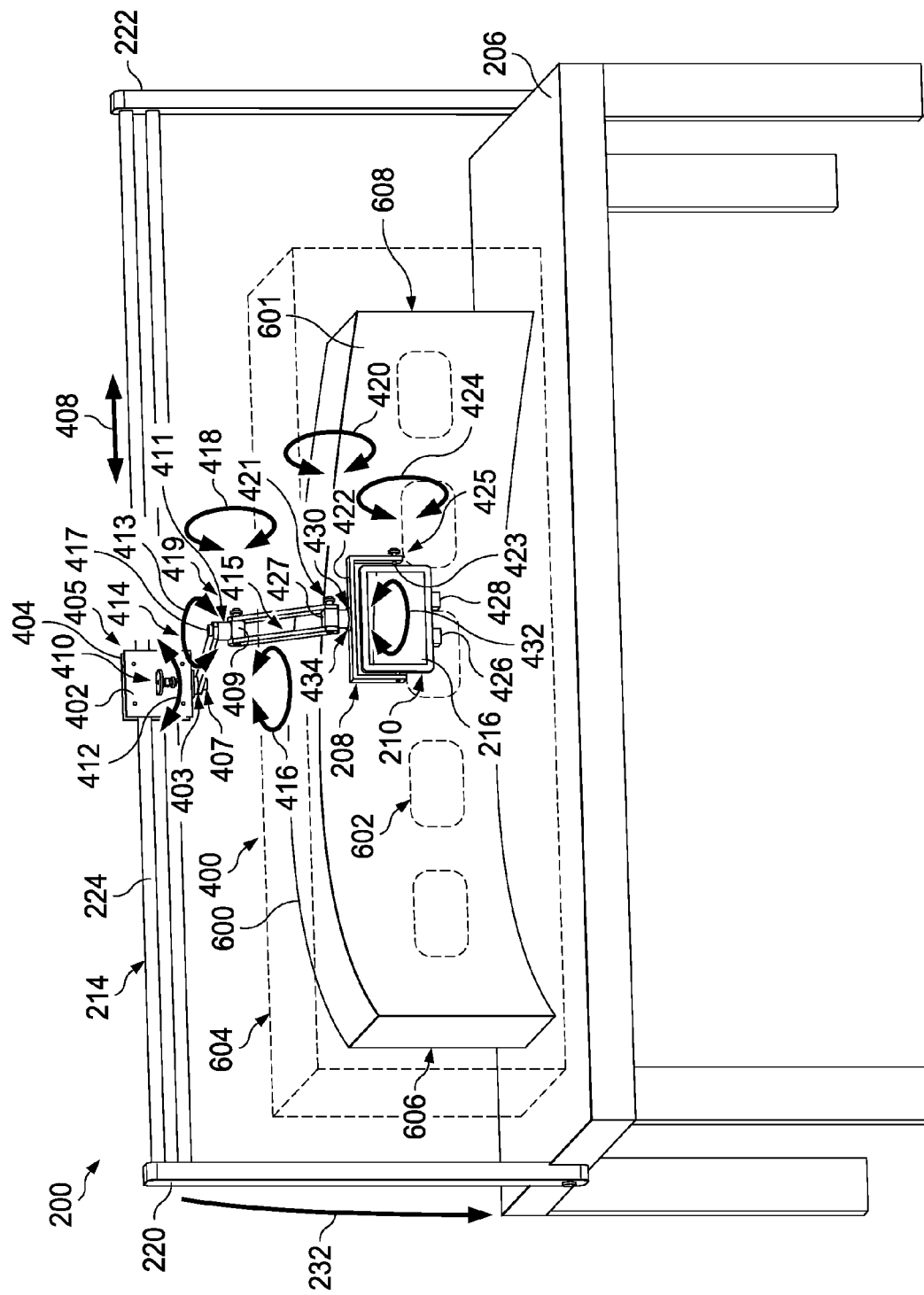
FIG. 8 is an illustration of a manufacturing environment with a visualization system using a mounting structure in accordance with an illustrative embodiment.

With reference now to FIG. 8, an illustration of manufacturing environment 200 from FIG. 2 with visualization system 208 using mounting structure 400 from FIG. 4 is depicted in accordance with an illustrative embodiment. As depicted, mounting structure 400 has been used to move output device 210 in front of product 600.

The controller of output device 210 may use sensor data provided by the encoders associated with mounting structure 400 to control the view of the virtual environment displayed on screen 216. When output device 210 is positioned in front of product 600 as shown, the view of the virtual environment may be displayed in a manner such that the view is a proportionally equivalent virtual view of the corresponding portion of product 600 in front of which output device 210 is positioned. In this manner, the view of the virtual product in the virtual environment may be collocated with the actual product 600.

Figure 9:
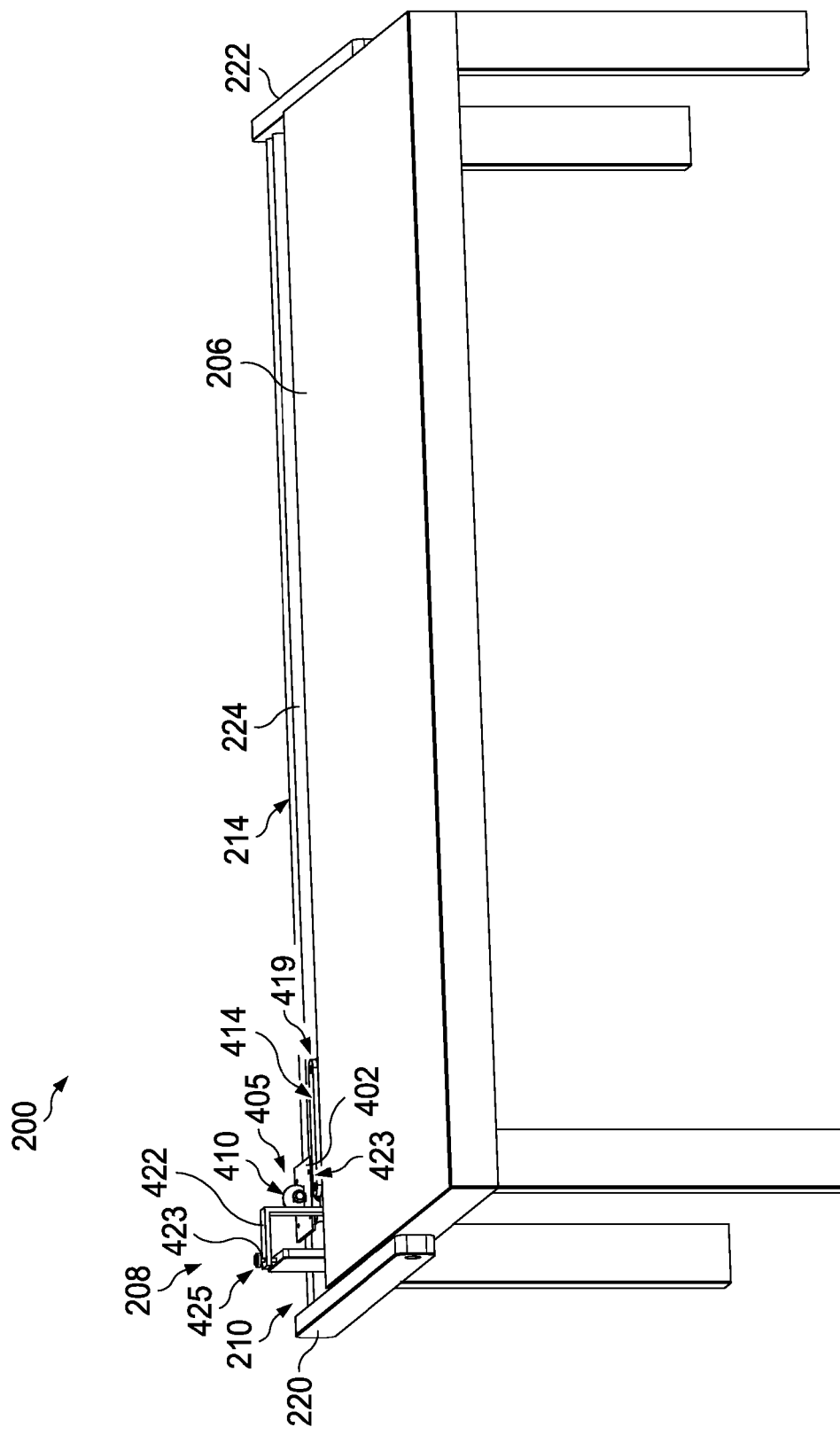
FIG. 9 is an illustration of a support structure, a mounting structure, and an output device being stowed away in accordance with an illustrative embodiment.

With reference now to FIG. 9, an illustration of support structure 214, mounting structure 400, and output device 210 being stowed away is depicted in accordance with an illustrative embodiment. In this illustrative example, member 220 and member 222 have been rotated relative to table 206 to stow support structure 214, mounting structure 400, and output device 210.

The illustrations of manufacturing environment 200 in FIG. 2 and in FIGS. 6-9, mounting structure 212 in FIGS. 2-3, and mounting structure 400 in FIGS. 4-9 are not meant to imply physical or architectural limitations to the manner in which an illustrative embodiment may be implemented. Other components in addition to or in place of the ones illustrated may be used. Some components may be optional.

For example, any number of movement devices, motors, locking devices, other types of mechanisms, or combination thereof may be associated with mounting structure 212, support structure 214, or both in FIG. 2 or mounting structure 400, support structure 214, or both in FIGS. 4-9. For example, in some cases, a locking mechanism may be associated with attachment element 305 in FIG. 3 to lock attachment element 305 in place relative to support structure 214 after attachment element 305 has been moved to a desired position relative to support structure 214.

In some illustrative examples, control of mounting structure 212, mounting structure 400, or both may be computerized. As one illustrative example, motors controlled by a computer may be used to control the movement of mounting structure 400 relative to support structure 214 and the movement of the different members and components of mounting structure 400 relative to each other. This motorization may be used to help, for example, without limitation, a human operator move the display with reduced resistance or to move output device 210 in an automated manner to a predetermined location.

The different components shown in FIGS. 2-9 may be illustrative examples of how components shown in block form in FIG. 1 can be implemented as physical structures. Additionally, some of the components in FIGS. 2-9 may be combined with components in FIG. 1, used with components in FIG. 1, or a combination of the two.

Figure 10:
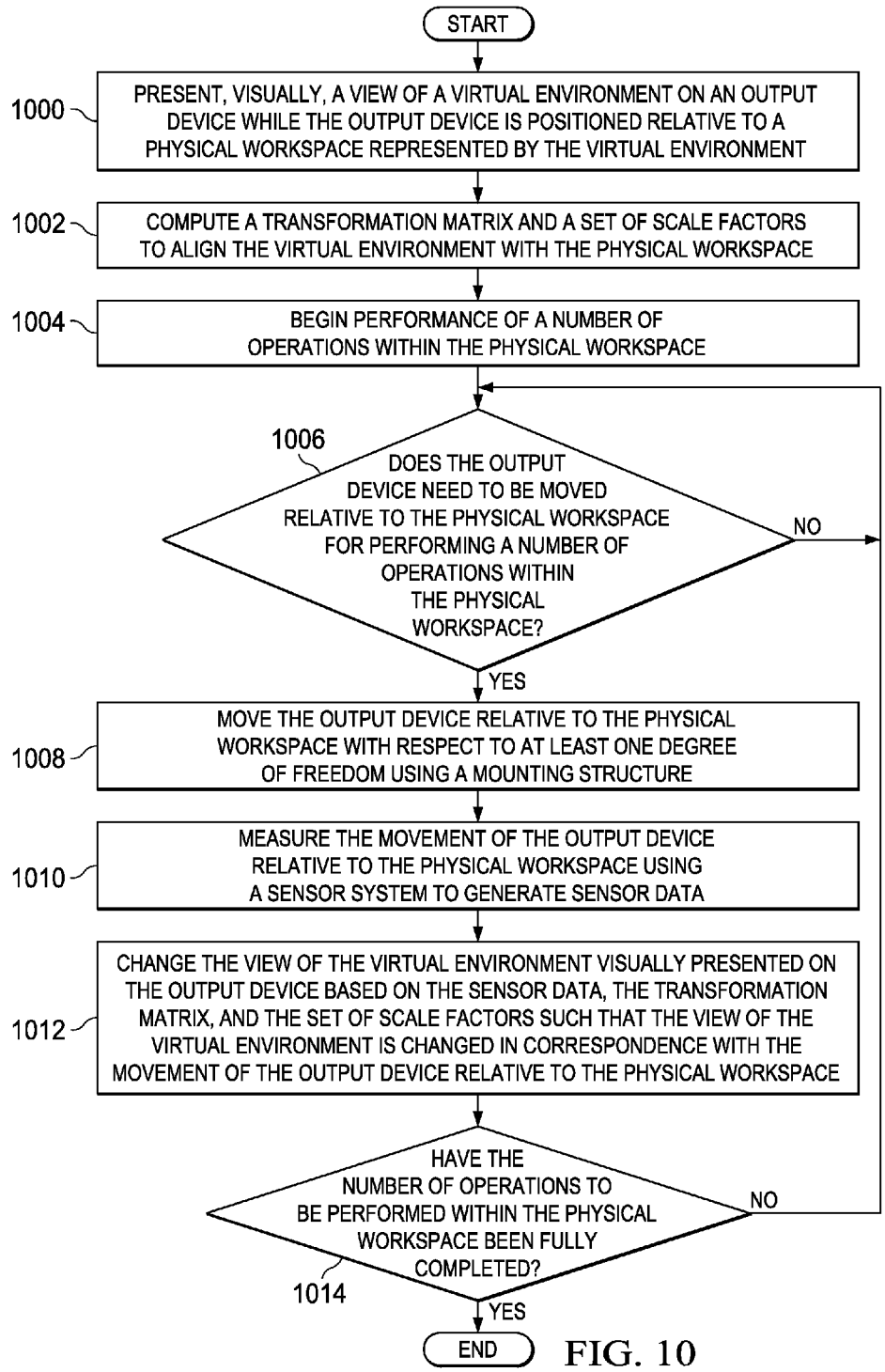
FIG. 10 is an illustration of a process for visually presenting a virtual environment relative to a physical workspace in the form of a flowchart in accordance with an illustrative embodiment.

With reference now to FIG. 10, an illustration of a process for visually presenting a virtual environment relative to a physical workspace is depicted in the form of a flowchart in accordance with an illustrative embodiment. The process illustrated in FIG. 10 may be implemented using visualization system 110 in FIG. 1.

The process begins by presenting, visually, a view of a virtual environment on an output device while the output device is positioned relative to a physical workspace represented by the virtual environment (operation 1000). Next, a transformation matrix and a set of scale factors are computed to align the virtual environment with the physical workspace (operation 1002).

Performance of a number of operations is then begun within the physical workspace (1004). A determination is then made as to whether the output device needs to be moved relative to the physical workspace for performing a number of operations within the physical workspace (operation 1006).

If the output device needs to be moved, the output device is then moved relative to the physical workspace with respect to at least one degree of freedom using a mounting structure (operation 1008). Depending on the implementation, the output device may be moved with up to six independent degrees of freedom in operation 1008.

The movement of the output device relative to the physical workspace is measured using a sensor system to generate sensor data (operation 1010). The view of the virtual environment visually presented on the output device is changed based on the sensor data, the transformation matrix, and the set of scale factors such that the view of the virtual environment is changed in correspondence with the movement of the output device relative to the workspace (operation 1012).

Next, a determination is made as to whether the number of operations to be performed within the physical workspace has been fully completed (operation 1014). If the number of operations to be performed has not been fully completed, the process returns to operation 1006 as described above. Otherwise, the process terminates. With reference again to operation 1006, if the output device does not need to be moved, operation 1006 is repeated.

Figure 11:
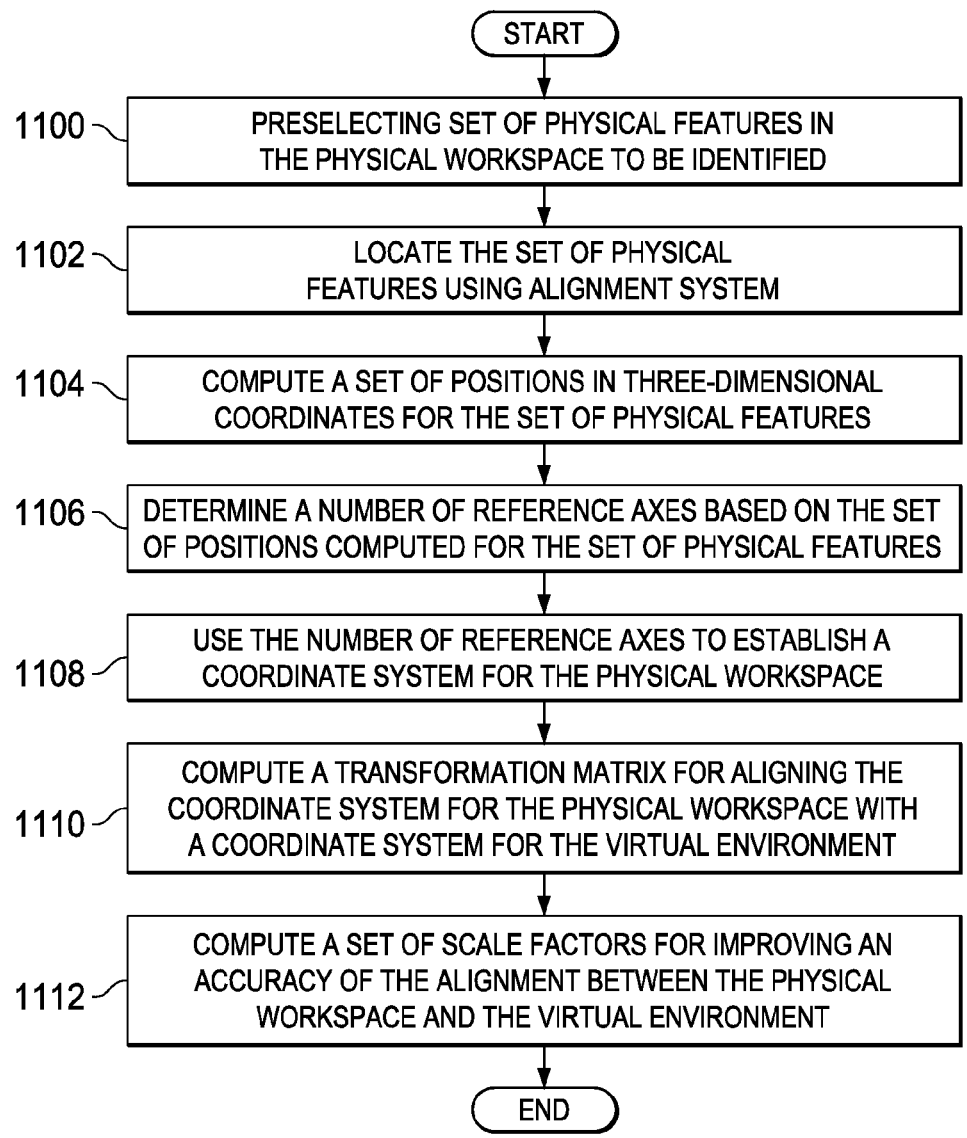
FIG. 11 is an illustration of a process for aligning a virtual environment and a physical workspace in the form of a flowchart in accordance with an illustrative embodiment.

With reference now to FIG. 11, an illustration of a process for aligning a virtual environment and a physical workspace is depicted in the form of a flowchart in accordance with an illustrative embodiment. The process illustrated in FIG. 11 may be implemented using visualization system 110 in FIG. 1. Further, this process may be used to implement operation 1002 in FIG. 10.

The process begins by preselecting a set of physical features in the physical workspace to be identified (operation 1100). Next, the set of physical features are located using an alignment system (operation 1102). The alignment system may include, for example, a laser device. A physical feature may be considered located when the laser beam emitted by the laser device coincides with the physical feature in the workspace.

Thereafter, a set of positions in three-dimensional coordinates for the set of physical features is computed (operation 1104). A number of reference axes are determined based on the set of positions computed for the set of physical features (operation 1106). The number of reference axes is used to establish a coordinate system for the physical workspace (operation 1108). In other illustrative examples, operation 1106 and operation 1108 may be replaced by one or more operations that include computing the positions of three non-collinear calibration points that are three non-collinear features in the workspace and using these three non-collinear calibration points to establish the coordinate system for the physical workspace.

Next, a transformation matrix for aligning the coordinate system for the physical workspace with a coordinate system for the virtual environment is computed (operation 1110). The transformation matrix defines the relationship between the physical workspace and the virtual environment.

Thereafter, the set of scale factors for improving an accuracy of the alignment between the physical workspace and the virtual environment is computed (operation 1112), with the process terminating thereafter. Operation 1112 may be performed by, for example, calculating the distance between the positions of two physical features in the workspace. The ratio of this distance to the corresponding distance between the corresponding virtual features in the virtual environment may be used as one of the scale factors in the set of scale factors for a particular axis. These steps may be repeated for each axis that needs to be defined. The set of scale factors may be used to improve the accuracy of the overall alignment between the physical workspace and the virtual environment.

Figure 12:
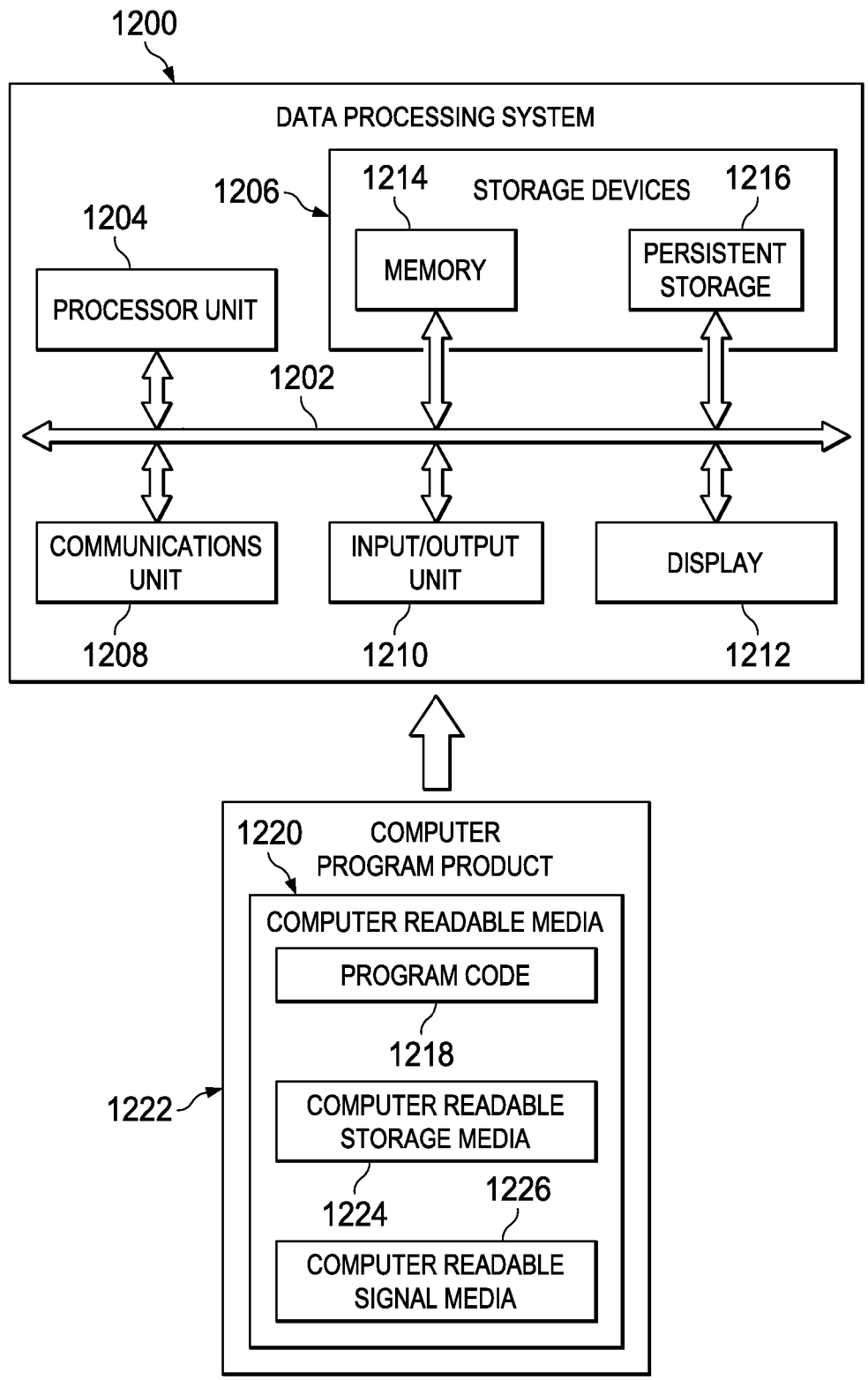
FIG. 12 is an illustration of a data processing system in the form of a block diagram in accordance with an illustrative embodiment.

Turning now to FIG. 12, an illustration of a data processing system is depicted in the form of a block diagram in accordance with an illustrative embodiment. Data processing system 1200 may be used to implement controller 120 in FIG. 1. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise at least one of a number of processors, a multi-processor core, or some other type of processor, depending on the implementation. In some cases, processor unit 1204 may take the form of a hardware unit, such as a circuit system, an application specific integrated circuit (ASIC), a programmable logic device, or some other suitable type of hardware unit.

Instructions for the operating system, applications and programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems, devices, or both. Communications unit 1208 may provide communications using physical communications links, wireless communications links, or both.

Input/output unit 1210 allows input to be received from and output to be sent to other devices connected to data processing system 1200. For example, input/output unit 1210 may allow user input to be received through a keyboard, a mouse, some other type of input device, or a combination thereof. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, or some other type of signal that can be transmitted over physical communications links, wireless communications links, or both.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

The illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1300 in FIG. 13. In particular, visualization system 110 from FIG. 1 may be used to visually present a virtual environment that includes a virtual product representing any product that is to be manufactured during any one of the stages of aircraft manufacturing and service method 1300. For example, without limitation, visualization system 110 from FIG. 1 may be used to visually present a virtual environment that includes a virtual aircraft structure representing an aircraft structure for aircraft 1400 during at least one of component and subassembly manufacturing 1306, system integration 1308, routine maintenance and service 1314, or some other stage of aircraft manufacturing and service method 1300.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of and reduce the cost of aircraft 1400.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method, apparatus, and system for displaying a virtual product relative to a physical product. Visualization system 100 described in FIG. 1 may allow virtual product 111 to be visually presented within or as part of virtual environment 108 relative to the corresponding physical product in a corresponding physical workspace. By allowing view 123 of virtual environment 108 displayed on output device 114 to change in correspondence with the movement of output device 114, visualization system 100 provides a greater degree of control to the operator controlling the movement of output device 114. This operator may be a human operator, a robotic operator, a motorized system under computerized control, or some other type of operator.

The type of display 122 provided by visualization system 100 in FIG. 1 and visualization system 208 in FIGS. 2-9 may improve the efficiency with which products are manufactured. This type of system may be used to improve the manner in which human operators are trained to work with, inspect, or perform other types operations involving physical products. With respect to manufacturing applications, having access to the virtual product while manufacturing the physical product without interfering with the manufacturing of the product may reduce the overall amount of time and effort needed to manufacture the product.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for visually presenting a virtual environment relative to a physical workspace, the apparatus comprising:
   an output device that visually presents a view of the virtual environment to guide a human operator in performing a number of operations within the physical workspace;
   a mounting structure that holds the output device and that is movable with at least one degree of freedom relative to the physical workspace;
   a sensor system associated with at least one of the mounting structure or the output device, wherein the sensor system measures movement of the output device relative to the physical workspace to generate sensor data; and
   a controller that computes a transformation matrix and a set of scale factors to align the virtual environment and the physical workspace, wherein the controller changes the view of the virtual environment based on the sensor data, the transformation matrix, and the set of scale factors;
   whereby the controller changes the view of the virtual environment in correspondence with the movement of the output device relative to the physical workspace.

2. The apparatus of claim 1, wherein the sensor system comprises:
   a sensor device that measures at least one of translational movement or rotational movement.

3. The apparatus of claim 2, wherein the mounting structure is an articulated structure and allows the output device to be moved relative to the physical workspace with the at least one degree of freedom up to six independent degrees of freedom.

4. The apparatus of claim 1 further comprising:
   a support structure, wherein the mounting structure is movable relative to the support structure.

5. The apparatus of claim 1 further comprising:
   an alignment system that enables an alignment of the physical workspace and the virtual environment by allowing a set of physical features in the physical workspace that correspond to a set of virtual features in the virtual environment to be located, wherein the set of physical features and the set of virtual features are preselected for the physical workspace and the virtual environment, respectively.

6. The apparatus of claim 5, wherein the controller uses the sensor data to compute a set of positions in three-dimensional coordinates for the set of physical features.

7. The apparatus of claim 6, wherein the controller establishes a coordinate system for the physical workspace based on the set of positions computed for the set of physical features and computes the transformation matrix for aligning the coordinate system for the physical workspace to a coordinate system for the virtual environment.

8. The apparatus of claim 5, wherein the alignment system comprises:
   a laser device that emits a laser beam that allows the set of physical features to be located within the physical workspace; and
   a lighting device associated with at least one of the mounting structure or the output device, wherein the lighting device illuminates a portion of the physical workspace for performing the number of operations within the physical workspace.

9. A system for visually presenting a virtual environment relative to a physical workspace, comprising:
   an output device that visually presents a view of the virtual environment to guide a human operator in performing a number of operations within the physical workspace;
   a support structure positioned relative to the physical workspace;
   a mounting structure that holds the output device, is movable with at least one degree of freedom relative to the physical workspace, and is moveable relative to the support structure;
   an alignment system that enables an alignment of the physical workspace and the virtual environment by allowing a set of physical features in the physical workspace that correspond to a set of virtual features in the virtual environment to be located, wherein the set of physical features and the set of virtual features are preselected for the physical workspace and the virtual environment, respectively;
   a sensor system that measures movement of the output device relative to the physical workspace to generate sensor data; and
   a controller that computes a set of positions for the set of physical features based on the sensor data and computes a transformation matrix and a set of scale factors to align the virtual environment and the physical workspace using the set of positions, wherein the controller changes the view of the virtual environment based on the sensor data, the transformation matrix, and the set of scale factors;
   whereby the controller changes the view of the virtual environment in correspondence with the movement of the output device relative to the physical workspace.

10. A method for visually presenting a virtual environment relative to a physical workspace, the method comprising:
    presenting, visually, a view of the virtual environment on an output device while the output device is positioned relative to the physical workspace;
    computing a transformation matrix to perform an alignment between the virtual environment and the physical workspace and a set of scale factors to improve an accuracy of the alignment;
    moving the output device relative to the physical workspace with respect to at least one degree of freedom using a mounting structure that holds the output device;

measuring movement of the output device relative to the physical workspace using a sensor system to generate sensor data; and changing the view of the virtual environment based on the sensor data, the transformation matrix, and the set of scale factors whereby the view of the virtual environment is changed in correspondence with the movement of the output device relative to the physical workspace.

11. The method of claim 10 further comprising:
moving the output device to a preselected location relative to the physical workspace using the mounting structure.

12. The method of claim 10, wherein moving the mounting structure comprises:
moving the mounting structure at least one of translationally with up to three independent degrees of translational freedom or rotationally with up to three independent degrees of rotational freedom.

13. The method of claim 10, wherein measuring the movement of the mounting structure comprises:
measuring at least one of a translational movement or a rotational movement using a number of sensor devices in the sensor system.

14. The method of claim 10, wherein changing the view of the virtual environment comprises:
changing a viewpoint from which the virtual environment is visually presented in a display on the output device in correspondence with the movement of the output device relative to the physical workspace.

15. The method of claim 10 further comprising:
locating a set of physical features that has been preselected for the physical workspace using an alignment system.

16. The method of claim 15, wherein computing the transformation matrix and the set of scale factors to align the virtual environment and the physical workspace comprises:
computing a set of positions for the set of physical features using the sensor data;
establishing a coordinate system for the physical workspace using the set of positions computed; and
computing the transformation matrix that aligns the coordinate system for the physical workspace with a coordinate system for the virtual environment.

17. The method of claim 16, wherein computing the transformation matrix and the set of scale factors to align the virtual environment and the physical workspace further comprises:
computing a distance between positions of two physical features in the set of physical features; and
computing a ratio of the distance to a corresponding distance between two corresponding virtual features in the virtual environment as a scale factor in the set of scale factors.

18. The method of claim 10, wherein presenting, visually, the view of the virtual environment on the output device while the output device is positioned relative to the physical workspace comprises:
presenting, visually, a display on the output device that includes the view of the virtual environment.

19. The method of claim 18 further comprising:
determining whether the output device is in a preselected location relative to the physical workspace based on the sensor data; and
performing a number of actions in response to a determination that the output device is in the preselected location.

20. The method of claim 19, wherein performing the number of actions comprises:
performing at least one of adding instructions corresponding to the preselected location to the display, playing an audio recording of instructions or warnings, playing a video on another portion of the output device, visually presenting a new virtual element in the display, changing a state of existing virtual elements in the virtual environment in the display, sending a signal to another application implemented using a controller, sending data to another computer system over a communications link, or writing data to a file.

* * * * *